March 24, 1970 J. A. R. MIROUX 3,503,052

SEMIPERMANENT MEMORY WITH ELECTRICALLY SCANNABLE INDEX CARDS

Filed Dec. 21, 1966 3 Sheets-Sheet 1

JEAN A.R. MIROUX
*INVENTOR.*

BY

Karl F. Ross
*Attorney*

March 24, 1970 J. A. R. MIROUX 3,503,052

SEMIPERMANENT MEMORY WITH ELECTRICALLY SCANNABLE INDEX CARDS

Filed Dec. 21, 1966 3 Sheets-Sheet 2

JEAN A.R. MIROUX
INVENTOR.

BY

Karl F. Ross
Attorney

JEAN A. R. MIROUX
INVENTOR.

BY

Karl F. Ross
Attorney 3,503,052

SEMIPERMANENT MEMORY WITH ELECTRICALLY SCANNABLE INDEX CARDS

Jean A. R. Miroux, Paris, France, assignor to Association des Ouvriers en Instruments de Precision, Paris, France, a company of France Filed Dec. 21, 1966, Ser. No. 603,586
Claims priority, application France, Dec. 29, 1965, 44,233
Int. Cl. G11b 5/00
U.S. Cl. 340—173 8 Claims

ABSTRACT OF THE DISCLOSURE

The invention relates to a memory in which a multiplicity of storage levels are provided in the form of card holders arrayed on a set of mounting bolts or the like, each holder comprising two mutually orthogonal arrays of conductors supported (preferably in the form of printed circuits) on confronting faces of two parallel carrier plates, or on opposite faces of a single carrier plate, for juxtaposition with a data card having formations (such as loops, tabs or magnetic shields) for establishing, intensifying or preventing a mutual coupling between respective conductors of the two arrays at selected intersections. In order to insure accurate alignment between these intersections and the coupling formations of the associated card, abutments are rigidly secured to the carrier plate or plates for engagement with the edges of the card; if the two arrays are carried on separate plates, the latter are made rigid with an intervening spacer forming the abutment means. The spacer is preferably U-shaped to engage the card on three sides.

My present invention relates to a semipermanent memory or register for the storage of digital information on data cards adapted to be inserted in pockets of respective holders each provided with two mutually orthogonal planar arrays of conductors spaced apart for reactive (i.e. inductive or capacitive) coupling of respective conductors thereof at selected intersections through the intermediary of suitable formations correspondingly positioned on the associated control card. The pattern of formations on the card consists of binary digits or bits which have the value "1" at the coupled junctions and the value "0" at the uncoupled intersections, each row of such bits representing a "word" of the stored information.

It has been the practice heretofore to support the two orthogonal arrays of conductors on confronting faces of a pair of otherwise nonconductive spaced-apart plates defining between them a pocket for the insertion of the card. These carrier plates, metalized on their outer surfaces to shield the unit from electrostatic or electromagnetic fields of adjacent units, were provided with marginal perforations through which mounting rods or the like could be threaded whereby any desired number of such units could be assembled in a stack to form a multiplicity of memory levels.

There are several ways in which the selective coupling between intersecting conductors of two arrays may be accomplished with the aid of a juxtaposed data card having formations capable of modifying the transmission of electrical energy between these conductors. Direct inductive coupling is possible if two intersecting conductors, while retaining their generally orthogonal orientation, are of zigzag, meandering or similar configuration so chosen that certain portions thereof are in registry in the area of intersection; if an interposed card of nonmagnetic and preferably nonconductive material is formed with magnetically permeable shields (e.g. of ferrite) at selected locations, the conductors intersecting at these locations will be mutually decoupled. Indirect inductive coupling is realizable if the conductors of each array are paired to form a plurality of two-wire lines in which a current pulse flows in opposite directions, the four leads of two intersecting lines thus defining a rectangle (possibly a square) which may be brought into registry with an identically dimensioned conductive loop on the data card whereby the two lines are mutually coupled through the intermediary of a current pulse induced in the loop. Finally, the conductors of the two arrays could also be coupled capacitively by being formed with relatively offset enlargements, e.g. in the form of right triangles complementing each other to a rectangle, the associated card bearing a corresponding (e.g. rectangular) conductive tab which registers with both these formations for electrostatically coupling them to each other.

In each of these instances it is extremely important that the card be accurately positioned, usually within several hundredths of a millimeter, with reference to the adjoinig conductor array in order to afford close coupling at selected intersections while minimizing stray fields at other points. Such accurate positioning, however, has been difficult to maintain with the conventional assemblies referred to, inasmuch as the need for a slidability of the carrier plates and the card-engaging spacers therebetween on their mounting bolts required certain tolerances which, particularly after prolonged use, result in slight but significant displacements of the carrier plates relative to each other and to the associated cards.

It is, therefore, the general object of my present invention to provide an improved assembly of the character described in which the means for locating the card and for supporting the conductors are so disposed as to maintain same in precise alignment with one another.

To realize this object, I propose to provide each carrier plate with abutment means rigidly connected therewith and serving to locate the associated data card with reference to the conductors, the means for connecting the abutments with the plates being independent of the means for assembling the latter in a stack which may be accomplished by mounting bolts or rods passing with substantial clearance through marginal cutouts in the carrier plates.

If the two arrays of each memory level are supported on confronting faces of separate plates, as would be necessary for direct inductive coupling, the two plates may be rigidly interconnected by studs or pins passing through an intervening U-shaped spacer which forms the abutment means. In accordance with a more specific feature of my invention, however, I prefer to support the two arrays on opposite sides of a single insulating carrier plate, rigid with the U-shaped spacer, and to provide a backing plate on the opposite side of the spacer to form the pocket for the insertion of the card. In this case, of course, the carrier plate must be thin enough to insure satisfactory coupling, of the capacitive or the indirectly inductive type, through the conductive formations of the inserted card. It will also be desirable to maintain this card in close proximity to the carrier plate, for which reason I prefer to place an elastic insert (such as a corrugated plastic or metal sheet) in the pocket between the backing plate and the rear face of the card. The backing plate should be conductive to serve as a shield between adjacent units; it may be constituted by a separate member of by a metalized supporting plate to which the carrier plate of the next-adjoining unit is physically attached.

An elemental unit according to this invention may be used in any computer, programmer, index register or other system wherein several "words," each assigned to one of several parallel output lines, are to be read concurrently by successive energization of the associated input lines. The unit is particularly—though not exclusively—adapted for use in conjunction with a data card of the type disclosed and claimed in my copending application Ser. No. 603,588, filed on even date herewith and now abandoned.

The invention will be described in greater detail with reference to the accompanying drawing in which.

Figures 1, 2, 4:
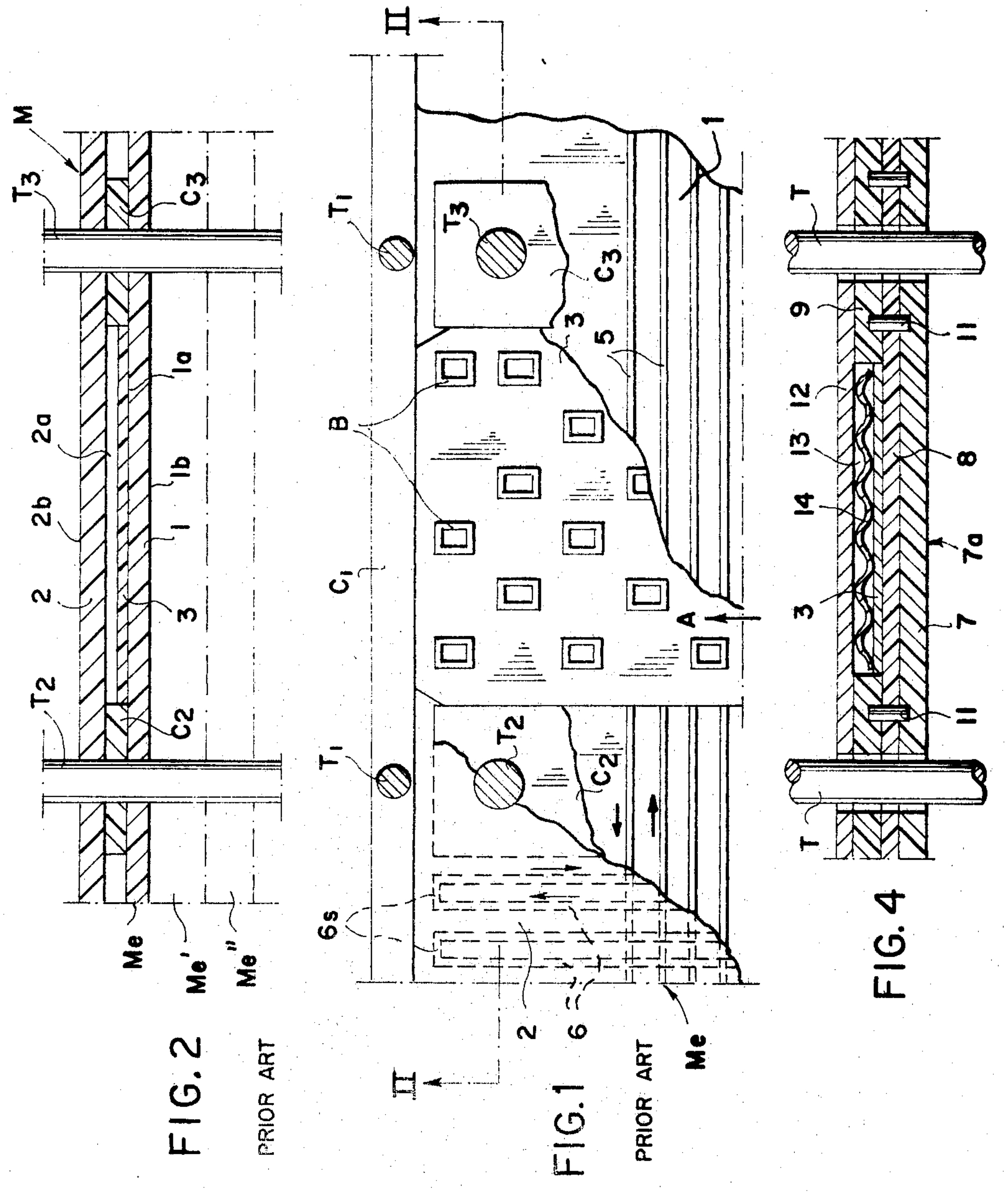
FIG. 1 is a plan view (parts broken away) of an elemental unit of a semipermanent memory forming part of a stacked assembly according to the prior art.
FIG. 2 is a cross-sectional view taken on the line II—II of FIG. 1 and showing the position of the unit within the stack.
FIG. 4 is a cross-sectional view taken on the line IV—IV of FIG. 3.

In FIGS. 1 and 2 I have illustrated part of a multilevel register or memory M of the semipermanent type just described, comprising a multiplicity of elemental units M*e*, M*e*′, M*e*″, etc. assembled into a stack by means of a set of parallel mounting bolts $T_1$, $T_2$, $T_3$. Each unit comprises a pair of parallel carrier plates 1, 2 held separated, with small clearance, by thin spacing strips $C_1$, $C_2$, $C_3$, which are respectively traversed, with small tolerance, by the bolts $T_1$, $T_2$, $T_3$ also passing with a similarly tight fit through the carrier plates 1 and 2. These plates define, together with the spacer $C_1$, $C_2$, $C_3$, a pocket open on one side for the insertion of a data card 3 into a reading position (arrow A in FIG. 1) in which it is peripherally engaged by these three spacers. A first array of paired conductors 5, printed upon the face 1*a* of carrier plate 1 adjoining the card 3, and a second array of paired conductors 6, extending at right angles to conductors 5 and printed on a confronting face 2*a* of carrier plate 2, form rectangular intersections some of which coincide with rectangular metal loops B, printed on a surface of card 3, when this card is in its reading position. Each pair of conductors 5 or 6 is short-circuited at one end, as illustrated at 6*s* for the leads 6, to form a two-wire line along whose leads a current pulse will travel in opposite directions as indicated by the arrows in FIG. 1. The conductors 6 may be considered as input leads to which a sensing pulse may be sequentially applied to scan the inserted card; the several pairs of these conductors may therefore be provided with separate terminals successively connectable to a voltage source. Conductors 5 may be considered as the output leads of the unit, with each two-lead line connected to an individual indicator or other load. The external faces 1*b* and 2*b* of carrier plates 1 and 2 are metalized to shield adjacent units M*e*, M*e*′, M*e*″ from one another.

In the operation of the conventional arrangement shown in FIGS. 1 and 2 the appearance of a sensing pulse in a pair of input conductors 6 will give rise to a reading pulse in those pairs of output conductors 5 which intersect the energized pair of conductors 6 at the location of a loop B on the card 3. It will be noted that conductors 5 extend across several card-receiving pockets so that at any level of memory M a plurality of cards 3 may be sequentially scanned in a single operating cycle.

The arrangement just described, although theoretically satisfactory, suffers from the aforestated drawback of inaccuracy due to the necessary tolerances between rods or bolts $T_1$, $T_2$, $T_3$, on the one hand, and elements 1, 2, $C_1$, $C_2$, $C_3$, on the other. As the mounting holes of these elements are susceptible to wear upon repeated disassembling and reassembling, the resulting disalignment between the loops B and the intersections of lines 5, 6 is liable to worsen in time.

Figure 3:
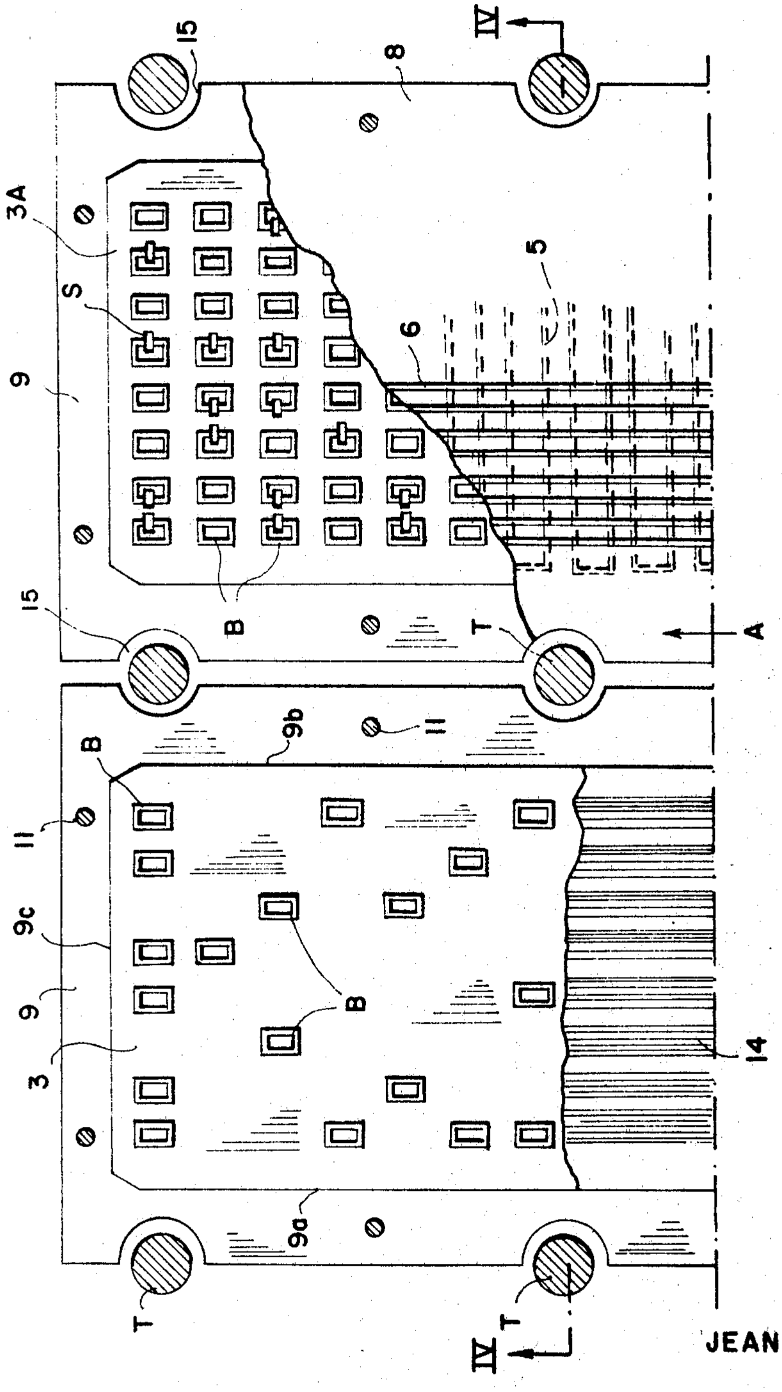
FIG. 3 is a view generally similar to FIG. 1, illustrating my present improvement.

This drawback is eliminated in the improved arrangement of FIGS. 3 and 4 in which each card is receivable in a flat pocket open at one side, this pocket is formed between a dielectric carrier plate 8, having opposite faces formed with the conductor arrays 5 and 6, and a conductive backing plate 12 defining a clearance 13 therebetween for the insertion of a card 3. An insulating supporting plate 7 is adhesively secured to carrier plate 8 and is connected via pins 11 with a U-shaped bracket 9 of insulating material serving as a stop for the card 3. Edges 9*a*, 9*b*, 9*c* of bracket 9 constitute abutments for corresponding edges of the card which is thus maintained in an invariable position relative to the conductors 5 and 6 on plate 8, the latter being also traversed without tolerance by the studs 11. On the other hand, plates 7, 8 and 12 as well as bracket 9 are formed with marginal cutouts 15 which are of slightly larger diameters than the associated mounting bolts T (the difference in size having been exaggerated in the drawing) whereby several units such as the one just described may be easily assembled on these rods to form a stack similar to the one illustrated in FIG. 2. In order to help retain the card 3 in its pocket 13, and to insure its close contact with the adjacent face of plate 8, I position an elastic insert 14 between the card 3 and the backing plate 12, this insert being here shown as a corrugated sheet whose ribs extend parallel to the direction of card insertion indicated by arrow A. Owing to this orientation of the ribs, pressure is exerted upon the card 3 particularly in the region of the loops B; also, the insertion and withdrawal of the card does not entail any objectionable deformation thereof since it takes place in the direction of the ribs.

In the left-hand portion of FIG. 3 I have illustrated a card 3 whose loops B appear only at the desired intersections; this card may have been produced from a standard blank having a complete array of loops, coinciding with all the intersections, by the selective removal of some of these loops through a scraping operation. On the right-hand side of FIG. 3, on the other hand, I have shown a modified card 3A which operates in essentially the same manner as card 3 but wherein the undesired loops have been rendered ineffectual by being severed through the punching of rectangular slots S into these loops, this technique being the subject matter claimed in my copending application referred to above. These cards, consisting for example of epoxy/glass fiber laminate, may have the slots S formed therein by means of conventional punch-card perforators either manually or under the control of a corresponding matrix or master card.

The backing plate 12 of FIG. 4 may be omitted if the supporting plate 7 of the next unit is disposed in its place and has its face 7*a* metalized for shielding purposes.

Figure 6:
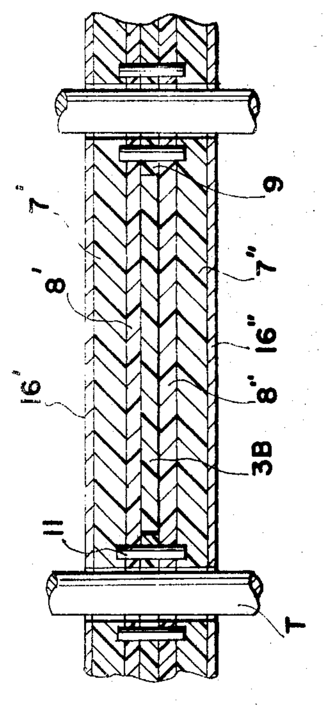
FIG. 6 is a cross-sectional view taken on the line VI—VI of FIG. 5.
Figure 5:
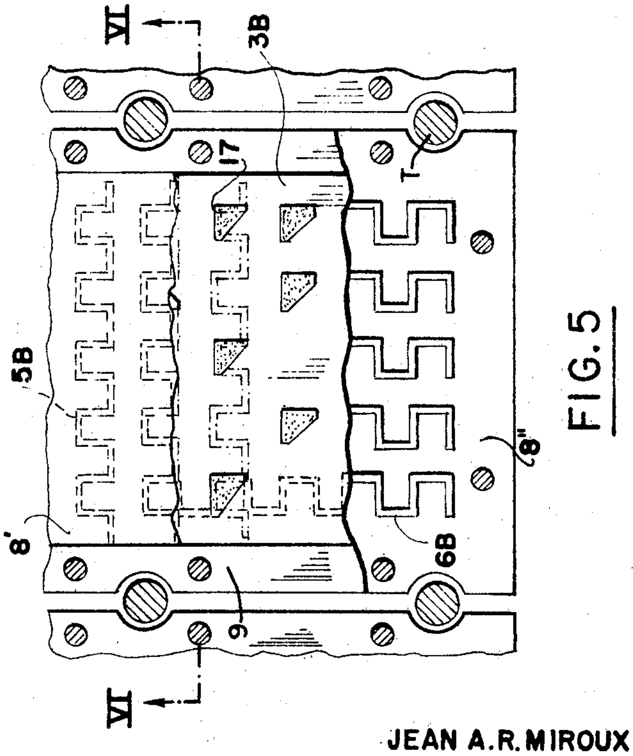
FIG. 5 is another view similar to FIG. 1, illustrating a modification.

Whereas in the system heretofore described there is indirect coupling between respective input lines 6 and output lines 5 at selected intersections, by virtue of the presence of loops B on the card 3 or 3A, it is also possible to utilize direct inductive coupling by an arrangement as illustrated in FIGS. 5 and 6, comprising two carrier plates 8′, 8″ on respective supporting plates 7′, 7″, externally metalized at 16′ and 16″, between which an insulating and nonmagnetic card 3B is insertable. Studs 11, passing through the aforementioned plates and the intervening bracket 9, hold the assembly together independently of the mounting rods T which traverse marginal cutouts as in the preceding embodiment.

The orthogonally related conductors 5B and 6B, respectively printed onto confronting faces of carrier plates 8′ and 8″, are of meandering shape so that portions thereof exactly coincide at their intersections. At selected locations, i.e. where coupling is not desired, the card 3B has small ferromagnetic shields 17 attached (e.g. printed) thereto so as to shield the intersecting conductors from each other.

Figure 7:
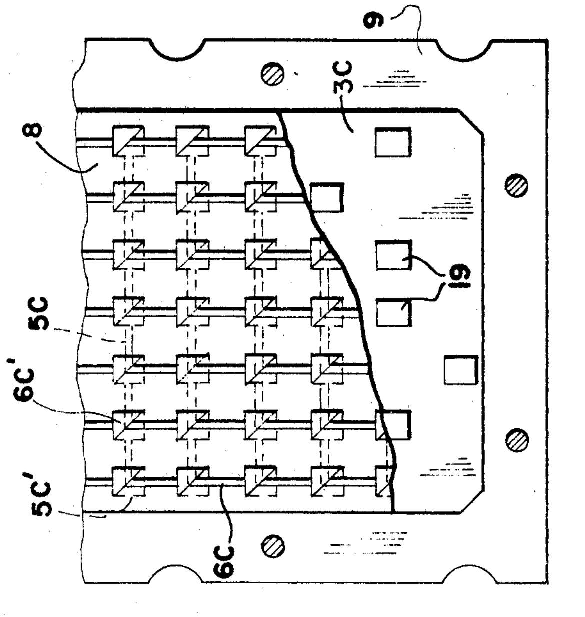
FIG. 7 is a further plan view showing yet another modification.

In FIG. 7, finally, I have shown part of an assembly generally similar to that of FIGS. 3 and 4 wherein opposite faces of plate 8 carry arrays of single conductors 5C and 6C integrally printed with large conductive areas 5C' and 6C' of complementary triangular shape. A card 3C, inserted between the arms of bracket 9, has rectangular conductive tabs 19 printed on it which register with the confronting triangles 5C' and 6C' for capacitively coupling same to each other at selected junctions.

I claim:

1. A multilevel memory comprising a plurality of elemental units each adapted to receive at least one data card bearing electrically scannable digital information represented by a pattern of surface formations each capable of modifying the transmission of electrical energy between a pair of adjacent conductors, each of said units being provided with means including at least one nonconducting carrier plate for supporting two mutually orthogonal conductor arrays in closely spaced relationship, abutment means defining with said carrier plate a flat pocket open at one side for the insertion of a data card having said surface formations disposed adjacent selected intersections of said two arrays whereby electric energy supplied to the conductors of one array is selectively transmitted to conductors of the other array, fastening means securing said abutment means to said carrier plate in a fixed relative position, and mounting means independent of said fastening means disposed beyond the outline of said pocket for assembling said units into a stack.

2. A memory as defined in claim 1 wherein said abutment means comprises a U-shaped bracket engageable with said card on three sides.

3. A memory as defined in claim 2 wherein said fastening means comprises a plurality of studs traversing said bracket and said carrier plate.

4. A memory as defined in claim 2, further comprising a backing plate adjoining said bracket on the side opposite said carrier plate and forming a boundary surface of said pocket.

5. A memory as defined in claim 4 wherein said backing plate is metallic.

6. A memory as defined in claim 4 wherein said backing plate is a nonconductive supporting member for the carrier plate of an adjoining unit, said member having a metallized face confronting said pocket.

7. A memory as defined in claim 4, further comprising a resilient insert disposed in said pocket adjacent said backing plate for exerting pressure upon said card urging same against said carrier plate.

8. A memory as defined in claim 7 wherein said insert is a corrugated sheet having ribs extending in the insertion direction of said card in line with the conductors of one of said arrays.

References Cited

UNITED STATES PATENTS

| | | | |
|---|---|---|---|
| 2,943,312 | 6/1960 | Von Kummer | 340—347 |
| 3,100,296 | 8/1963 | Jonker | 340—173 |
| 3,118,133 | 1/1964 | Meeker | 340—173 |

TERRELL W. FEARS, Primary Examiner

U.S. Cl. X.R.

235—61.11